US011017051B2

(12) United States Patent
Pilkington et al.

(10) Patent No.: US 11,017,051 B2
(45) Date of Patent: May 25, 2021

(54) ANALYZING READABILITY OF COMMUNICATIONS

(71) Applicant: International Business Machines Corporation, Armonk, NY (US)

(72) Inventors: Adam Pilkington, Eastleigh (GB); Graham Charters, Hampshire (GB); Gordon Hutchison, Eastleigh (GB); Tim Mitchell, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 15/700,219

(22) Filed: Sep. 11, 2017

(65) Prior Publication Data
US 2019/0080018 A1    Mar. 14, 2019

(51) Int. Cl.
*G06F 16/957* (2019.01)
*G06F 16/2457* (2019.01)

(52) U.S. Cl.
CPC .... *G06F 16/9577* (2019.01); *G06F 16/24578* (2019.01)

(58) Field of Classification Search
CPC ............... G06F 16/9535; G06F 16/958; G06F 16/9577; G06F 16/24578
See application file for complete search history.

(56) References Cited

U.S. PATENT DOCUMENTS

| 2002/0059339 | A1 | 5/2002 | McCormick et al. | |
|---|---|---|---|---|
| 2007/0067294 | A1 | 3/2007 | Ward et al. | |
| 2008/0070205 | A1* | 3/2008 | Amick | G06Q 10/00 434/178 |
| 2014/0379688 | A1* | 12/2014 | Liang | G06F 16/955 707/708 |
| 2015/0074103 | A1* | 3/2015 | Philip | G06Q 10/0633 707/736 |
| 2015/0269156 | A1* | 9/2015 | Awadallah | G06F 16/24578 707/732 |
| 2015/0348300 | A1* | 12/2015 | Kaplan | G06F 3/0485 345/582 |
| 2015/0370758 | A1* | 12/2015 | Bank | G06Q 10/109 715/229 |

OTHER PUBLICATIONS

Stevens et al., "Measuring the Readability of Business Writing: The Cloze Procedure Versus Readability Formulas," The Journal of Business Communication, 1992, 16 pages.

(Continued)

*Primary Examiner* — Truong V Vo
(74) *Attorney, Agent, or Firm* — Peter Edwards (57) ABSTRACT

A computer-implemented method, system, and computer program product for analyzing readability of a communication intended for a target audience includes: analyzing the communication to determine a first readability measure associated with the communication; determining a second readability measure associated with the target audience based on one or more historical communications previously transmitted or received by the target audience; and generating a readability feedback signal for the communication based on the first readability measure and the second readability measure.

10 Claims, 4 Drawing Sheets

(56) References Cited

OTHER PUBLICATIONS

Unknown, "How Readable is Your Writing?" Readable.10, printed Sep. 8, 2017, 6 pages https://readability-score.com.
Beard et al., "Increasing the effectiveness of direct mail copy through the use of readability measures," Journal of Interactive Marketing, Published Mar. 1988, Abstract Only, 2 pages, http://onlinelibrary.wiley.com/doi/10.1002/dir.4000020204/abstract.
Pilkington et al., "Analyzing Readability of Communications," U.S. Appl. No. 16/528,712, filed Aug. 1, 2019.
List of IBM Patents or Patent Applications Treated as Related, dated Jul. 25, 2019, 2 pages.

* cited by examiner

ANALYZING READABILITY OF COMMUNICATIONS

BACKGROUND

The present disclosure relates to analyzing readability of communications, and more particularly to analyzing readability of communications between a provider and a target audience.

The present disclosure further relates to a computer program product comprising computer-readable program code that enables a processor of a system to implement such a method.

The present disclosure yet further relates to a system for analyzing readability of communications, such as written communications, documents, reading material, etc.

The development of computers and communications networks has brought about the ability to easily communicate. However, a remaining disabler of communications is the matching of the communicated message/material to a reading level/ability of its target audience. For example, communication may be hindered where a target audience (e.g. reader) is unable to easily understand the communicated material (e.g. reading material).

There exist established metrics that can determine a readability (e.g. reading level) of written communications. For instance, there are tools and websites that enable the generation of a 'reading score' for written material based on a number of algorithms. Computer software has also been developed for evaluating the readability of a document and for revising a document to a different readability level. However, the use of this computer software for document revisions may be difficult and time consuming.

SUMMARY

The present invention provides a computer-implemented method for analyzing readability of a communication intended for a target audience. The method includes analyzing the communication to determine a first readability measure associated with the communication. The method further includes determining a second readability measure associated with the target audience based on one or more historical communications previously transmitted or received by the target audience. A readability feedback signal for the communication is generated based on the first readability measure and the second readability measure.

The present invention further provides a system for analyzing readability of a communication intended for a target audience. The system is configured to analyze the communication to determine a first readability measure associated with the communication. The system is further configured to determine a second readability measure associated with the target audience based on one or more historical communications previously transmitted or received by the target audience. The system is further configured to generate a readability feedback signal for the communication based on the first readability measure and the second readability measure.

The present invention further provides a computer program product for analyzing readability of a communication intended for a target audience. The computer program product comprises a computer readable storage medium having program instructions embodied therewith. The program instructions are executable by a processing unit to cause the processing unit to perform a method comprising: analyzing the communication to determine a first readability measure associated with the communication; determining a second readability measure associated with the target audience based on one or more historical communications previously transmitted or received by the target audience; and generating a readability feedback signal for the communication based on the first readability measure and the second readability measure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program (e.g. various parts of one or more algorithms).

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network, such as a local area network, the Internet and so on, to cooperatively execute at least one embodiment of the methods of the present invention.

Proposed is a concept for analyzing readability of a communication intended for a target audience (such as an individual or group of people for example). By determining: a first readability measure for the communication; and a second readability measure for the target audience, the readability measure may be analyzed to assess a suitability of the communication for the target audience. Feedback (such as a warning signal or message) may then be provided based on the outcome of the assessment of the communication's suitability for the target audience. Thus, before a communication is provided to a target audience, an embodiment may be used to provide feedback on the suitability of the communication to its author. Such feedback may, for example, indicate that the readability of the communication exceeds the readability level of the target audience, thereby enabling the author to alter/modify the communication so that it better matches the readability level of the target audience. Proposed embodiments may therefore help to ensure that a communication is tailored to a readability level of its target audience (e.g. by providing a warning to the author if the communication it too complex or too simple/basic compared to the reading ability of the target audience).

Proposed embodiments may help to ensure that written correspondence can be understood by the intended receivers thereby avoiding a need to spend time on additional clarification and/or preventing inaction because the written correspondence was not understood.

In particular, a proposed concept used in embodiments may be centered on determining a readability measure for the target audience by analyzing previous or historical communications between the author (e.g. writer, creator or originator) of the communication and the target audience. For instance, where the communication is an email written by Person A for Person B, previous written communications (such as emails, text messages, social media interaction, internet messages, etc.) between Person A and Person B may be analyzed to determine a readability measure for Person B. Also, when determining this readability measure for Person B, a weighting measure may be implemented according to whether a previous communication was a direct communication (e.g. a single sender Person A to single receiver Person B) or was between Person A and a group of people/recipients within which Person B was included. Additionally, or alternatively, a weighting measure may be implemented according to the timing of the previous communication. For example, more recent communications may be weighted so as to be of greater importance, influence, or relevance for determining the readability measure. In this way, newer (or more recent) communications may be given more weight (e.g. via a temporal or time-based weighting value).

Where no information is available about previous or historical communications between the author (e.g. Person A) of the communication and the target audience (e.g. Person B), embodiments may determine a readability measure for the target audience by analyzing previous or historical communications transmitted and/or received by the target audience. In this way, proposed embodiments may cater for cases where the author has not previously communicated with the target audience/recipient(s). Also, as above, time-based weighting values may be applied to (or associated with) the historical communications, for example to make newer or more recent historical communications carry more weight in the determination of the readability measure. By determining a readability measure (e.g. reading score) for the target audience based on its previous communications (e.g. e-mails, text messages, social media interactions, internet messages, etc.) embodiments may enable the determination of an appropriate level of comprehension of the target audience using historical information which may improve the accuracy of the readability measure. Situations where there have been no prior communications between the author and target audience may thus be catered for.

Accordingly, there may be provided an approach that, when composing a new message, calculates a reading score for the message and calculates a reading level of the message's target audience. To calculate the reading level of the message's target audience, previous or historical communications to/from the target audience may be analyzed to. In this way, a large and/or detailed information resource relating to communication exchanges involving the target audience may be drawn upon to provide a more accurate determination of the reading level of target audience. The calculated score and reading level may then be compared and a warning provided (e.g. via an audible and/or visual message) if they are too far apart (e.g. if a difference between the score and reading level exceeds a predetermined acceptable threshold amount). Where the target audience comprises more than one recipient entity, a number of resolution algorithms may be used to determine an appropriate score at which to warn the author. For example, embodiments may simply use the lowest score for all recipients as a warning threshold value, or if it's an e-mail, the lowest score for recipients in in the 'To' field.

Also, where considered appropriate, skew can be applied between the typical level of complexity that a person writes at and an ideal limit of the complexity that they are likely to comprehend at. For instance, some excellent writers may be capable of writing clear simple text when this is what is required, but in other situations may write at a much higher reading level. Embodiments may take into account the highest commonly occupied writing/reading level by a target audience (e.g. recipient) understanding that notes from the target audience are sometimes simple as the message is simple.

Embodiments may thus provide concepts that facilitate the efficient creation and adjustment of written communications for a target audience. Such a target audience may comprise a single person or a group of people.

By way of further example, embodiments may propose extensions to written communication authoring tools for indicating whether communications are of an appropriate readability level for a target audience. Such extensions may provide constraints on how a communication should preferably be authored or created in order to take advantage of the proposed concepts. In this way, an author or creator of a communication may be assisted in the provision of appropriate written material.

Also, it is noted that, although embodiments are presented in the context of being applicable in the relation to written electronic communications, applicability of the proposed concepts may extend to other fields where written material or communications may need to be adapted for a target audience and/or where communications between an author/originator and a target audience take place. For example, embodiments may be implemented in relation to social media interactions where an author or creator of a social media message should be prevented from communicating a message that is overly simple/basic or complex for its intended audience.

Illustrative embodiments may therefore provide concepts analyzing readability of a communication intended for a target audience. Dynamic analysis and communication adjustment concepts may therefore be provided by proposed embodiments.

Modifications and additional steps to a traditional data storage and retrieval systems may also be proposed which may enhance the value and utility of the proposed concepts.

Communications can include, but are not limited to, written communications, documents, reading material, electronic and hard copy text materials, books, manuals, magazines, newspapers, word process documents, web page documents, email, and the like. By use of the subject matter disclosed herein, such communications may be adjusted to a specified target readability level. Accordingly, as used herein, the term "communication" may refer to any communication containing human-readable content, such as text. Examples of such include a document, a book, a manual, speech text, or any non-electronic hard copy material. A communication can be a text document produced in electronic form by typing into a keyboard of a computer using a text editor or word processor. For example, a communication may include a markup language document (e.g., a hypertext mark-up language (HTML) web page), text embedded in a markup language document, an email, and the like. Alternatively, a communication can be in a hard copy format that is received by scanning reading material with an optical character recognition device. Further, a communication may be input by speech into a speech recognition device or program.

The term "readability" may refer to a reading difficulty level of text in a communication. Several readability formulas or processes may be used for determining a readability level. Such readability formulas or processes may utilize mathematical formulas and/or computer or manual processes. In such processes, text of the communication may be scanned and analyzed to determine readability using suitable standards and measures such as, but not limited to, those described herein.

As used herein, the term "readability measure" may refer to any suitable measure of the readability of text in a communication. Also, in the context of a target audience, a readability measure of a target audience may refer to a measure of the readability (e.g. difficulty level or score) of text in a communication that can be easily understood, handled or otherwise coped with by the target audience.

Examples of readability measures include number of syllables in a word and/or sentence, number of grammatical errors (e.g., the number or proportion of sentences having grammatical errors), number or proportion of misspelled words, number or proportion of unfamiliar words (as defined by a word list that identifies unfamiliar words in any suitable manner), number or proportion of inappropriate or misused words, and the like. Another exemplary readability measure may include the total number of paragraphs, sentences, and/or words in the reading material. Yet another exemplary readability measure may include the total number or proportion of foreign language words (as defined by a word list which identifies foreign language words) in a communication. Another exemplary readability measure may include any standard or measure of correct or incorrect punctuation. Another exemplary readability measure may include any count or proportion of included abbreviations and/or missing punctuation. Another exemplary readability measure may include any count or proportion of "white space," such as, but not limited to, spaces, tabs, carriage returns, line feeds, new lines, and the like. Another exemplary readability measure may include any count or proportion of non-textual elements, such as, but not limited to, images, pictures, diagrams, colors, fonts, and the like. Another exemplary readability measure may include any measure of writing style, such as, but not limited to, active versus passive voice, narrative, sentence structure, paragraph structure, essay structure, grammatical correctness, correct or incorrect word use, and the like. In another example, a readability measure may include a number or proportion of familiar words as defined by a word list which identifies familiar words, such as a Dale-Chall list and a list of common words for English as a second language. In another example, a readability measure may include word frequency such as an average word frequency as determined by a list of words and their frequencies, which may be determined by any suitable means, such as, but not limited to, an analysis of a standard corpus of documents, books, manuals, or any other text. In yet another example, a readability measure may include sentence length such as, but not limited to, an average number of words in a sentence, a number or proportion of sentences exceeding a specified sentence length, or are ranked by a set of specified sentence lengths. In another example, a readability measure may include a number or proportion of paragraphs or passages which exceed a specified length, or are ranked by a set of specified lengths. Additional examples may include total number of grammatical errors, average number of grammatical errors per sentence, total number of misspelled words, percentage of misspelled words, number of sentences in the passive voice, number of sentences with multiple clauses, number of previously identified phrases or words that are to be avoided, and any other quantitative measure of the text or language content.

A readability level of a communication can be determined based on a scan of the text of the communication. For example, the text may be scanned to calculate the average sentence length of each sentence in words, the average frequency or commonality measure for each word from a word frequency index or standard corpus, and the average number of syllables in each word. A formula or process for determining the readability level can use the resulting averages and calculate the readability level. Exemplary readability formulas or processes include the Flesch Readability Index, the Flesch-Kincaid Grade Level, the Fog Index, the Bormuth Grade Level Readability Score, the Lexile Framework for Reading, and the like. A readability level as described herein can be calculated using any of these exemplary formulas or processes.

In examples provided herein, the readability level may be based on numbers, and lower numeric levels may indicate more-readable text (in which cases, decreasing readability levels correlate to increasing readability). If a subject readability system or process provides for readability levels that are scored in such a manner such that higher scores correspond to more readable text, then the readability level/scale of the subject system or process is reversed by multiplying the level calculated and reported by that readability system by −1 (i.e., negative one). Thus, concepts proposed herein may be applied to any readability scale, whether increasing or decreasing. Although it may be assumed herein that the readability level is based on numbers, any other suitable indicia may be used for indicating the readability level of reading material.

A readability level or score may be determined by a suitable formula or process which may depend on various basic readability measures such as average sentence length of the reading material, average word frequency compared to a standard corpus, average number of syllables in a word, average number of grammatical errors per sentence, and the like.

Figure 1:
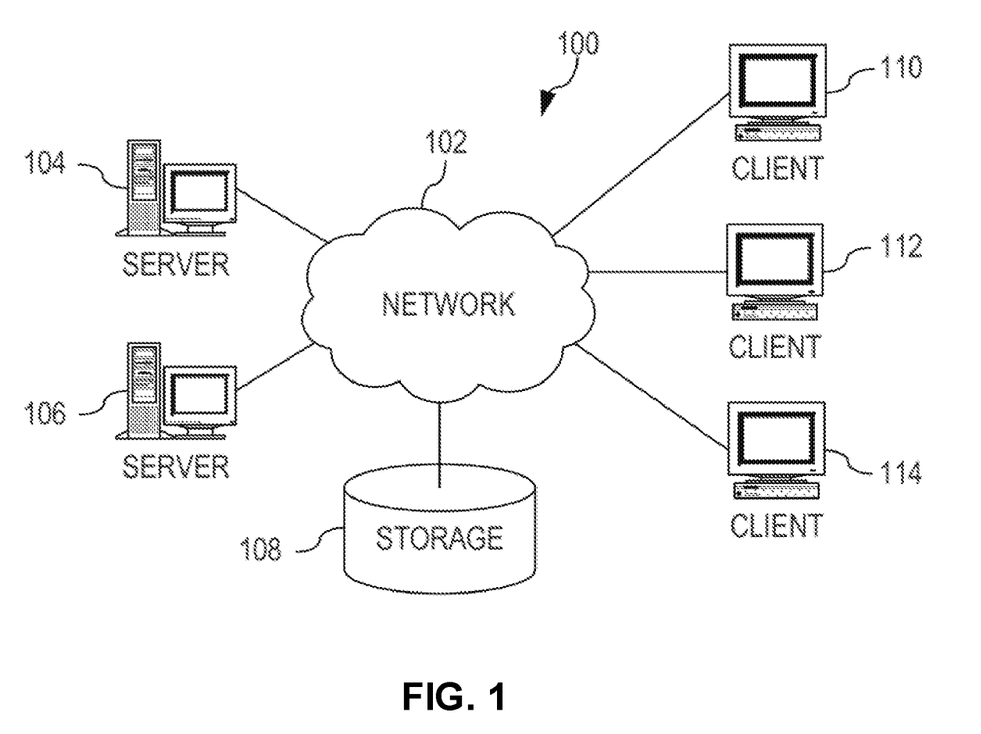
FIG. 1 depicts a pictorial representation of an example distributed system in which aspects of the illustrative embodiments may be implemented, according to various embodiments.
Figure 2:
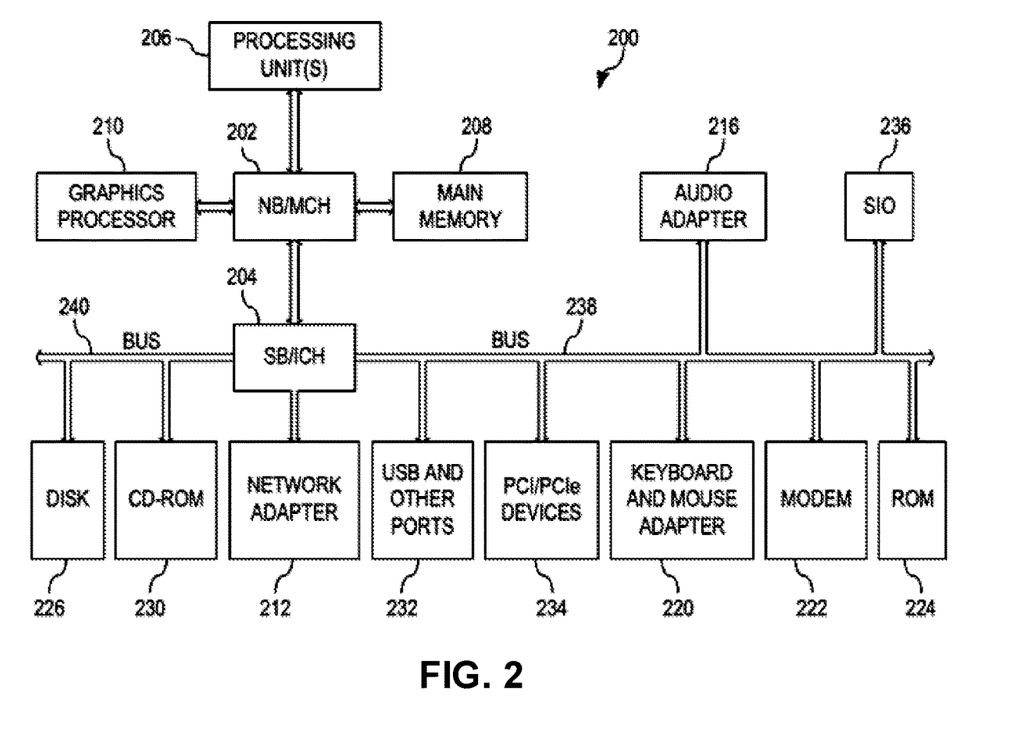
FIG. 2 depicts a block diagram of an example system in which aspects of the illustrative embodiments may be implemented, according to various embodiments.

According to one aspect, a system for adjusting readability of reading material to a target readability level may be implemented as hardware, software, and/or firmware components executing on or with one or more modules of a system operable to receive and store communications. Illustrative embodiments may be utilized in many different types of messaging processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data storage system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices 234 may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a communication system by providing feedback on whether a readability of a communication intended for a target audience is appropriate for the target audience. Embodiments may determine a readability measure or level that is appropriate for the target audience by analyzing previous/historical communication exchanges involving the target audience. Historical information relating to prior communication sent to/from the target audience may therefore be leveraged in order or to ascertain a readability measure or level for the target audience. More detailed and/or extensive information may therefore be drawn upon to provide a more accurate determination of the target audience's reading level. Such proposals can extend or improve the readability analysis capabilities of a communication system.

Figure 3:
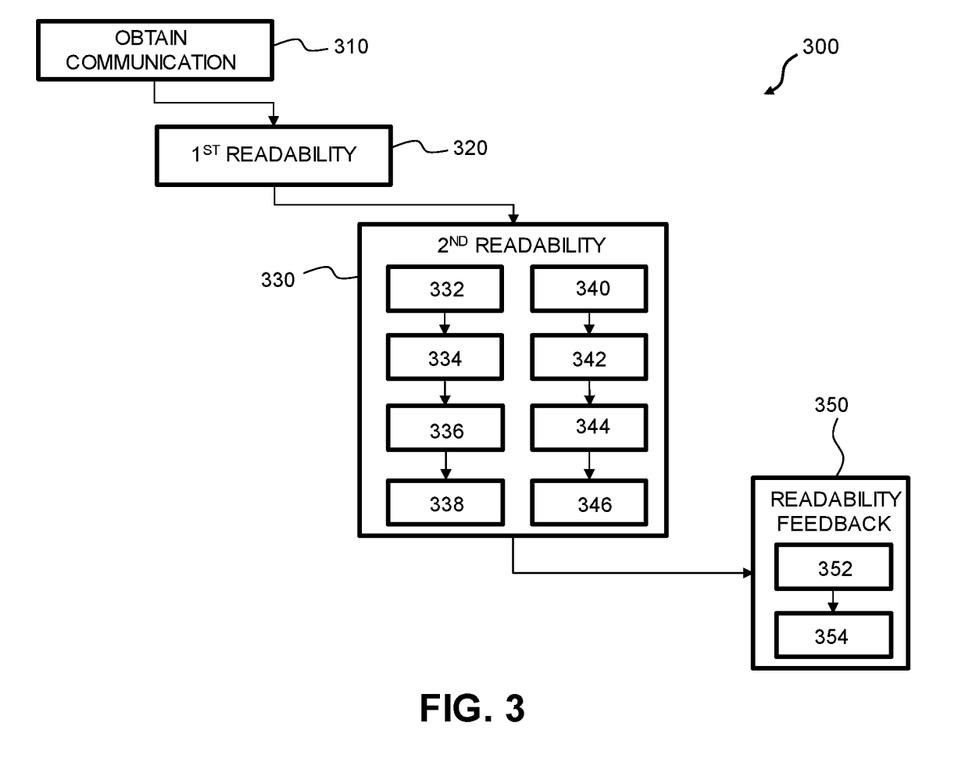
FIG. 3 depicts a flow chart illustrating an exemplary computer-implemented method for analyzing readability of a communication intended for a target audience in accordance with an embodiment, according to various embodiments.

FIG. 3 is a flow chart illustrating an exemplary computer-implemented method 300 for analyzing readability of a communication intended for a target audience in accordance with an embodiment of the subject matter described herein.

The method begins in step 310 by obtaining a communication intended for a target audience. Here, the communication may be in a digital format or any other suitable format that can be analyzed by a computer system. For instance, the communication may comprise at least one of: electronic text material; an electronic document; a web page document; an electronic message; and an email. By way of further example, the communication may be transmitted to the system (e.g. via the Internet) or may be generated within the system (e.g. by an author typing written content for the communication using a word processor, email application, messaging client, etc.). Also, information about the target audience may be provided as part of the communication and/or separately indicated by a user.

In step 320, the communication is analyzed to determine a first readability measure associated with the communication. In this example, the first readability measure may comprise a numerical value representative of a readability level of the communication. Many different approaches to the analysis may be used. Indeed, a wide range of methods for determining a readability measure are known. Accordingly, detailed explanation of how the first readability measure is determined is hereby omitted. However, purely by way of example only, the following equation may be used for indicating a readability formula or process by which readability measures can be determined:

$$r = f(x1, x2, x3, \ldots, xn) \qquad (1)$$

In equation (1) above, the variables $x1, \ldots, xn$ represent basic readability measures, such as average sentence length, average word frequency, average number of syllables in a word, and the like. The value r given by equation (1) is assumed to be such that decreasing values of r correspond to more easily read text. Accordingly, step 320 may employ any suitable readability formula or process which conforms to equation (1) for any number of basic first readability measures. For example, the Flesch-Kincaid reading level may be provided by the formula $r = f(x1, x2)$, where x1 is the average sentence length, and x2 is the average number of syllables in a word. The value r in this case represents the grade level of the text, such that lower levels indicate more easily read (more readable) text. It will be appreciated that other approaches may be employed, included (but not limited to): a Flesch Readability Index; a Flesch-Kincaid Grade Level; a Fog Index; a Bormuth Grade Level Readability Score; and a Lexile Framework for Reading.

In one example of determining the first readability measure in step 320, the communication may be scanned and basic readability measures $x1, x2, \ldots, xn$ may be calculated in accordance with readability measures defined by a predetermined set of rules.

In step 330, a second readability measure associated with the target audience is determined based on one or more historical communications previously transmitted or received by the target audience.

Here, where previous communications between the author of the communication and the target audience have occurred, the step 330 of determining a second readability measure associated with the target audience may comprise the step 332 of identifying, from the one or more historical communications, a historical communication between an author of the communication and the target audience. A primary historical readability measure may then be determined in step 334 based on the identified historical communication between the author of the communication and the target audience. Also, a weighting value associated with the primary historical readability measure may be determined in step 336 based on at least one of: a time at which the identified historical communication between the author of the communication and the target audience was transmitted or received by an additional audience; and whether the identified historical communication between the author of the communication and the target audience was transmitted or received by an additional audience. Based on: (i) the primary historical readability measure; and (ii) the weighting value associated with the primary historical readability measure, the second readability measure associated with the target audience may then be determined in step 338. Thus, it will be understood that the step 330 of determining a second readability measure associated with the target audience may comprise sub-steps 332-338 which may analyze previous communications between the author and target audience so as to derive an indication of a readability of the target audience. Since such prior dialogue or communication between the author and target audience may be highly relevant for indicating a preferential or established level of readability when communicating between the author and target audience, historical readability measures obtained using such historical communications may be thought of as being 'primary' for the purpose of assessing a preferred readability level.

Alternatively, or additionally, previous/historical communications not between the author of the communication and the target audience may also be analyzed for the purpose of determining the second readability measure associated with the target audience. Thus, by way of example, the step 330 of determining a second readability measure associated with the target audience may comprise the step 340 of identifying, from the one or more historical communications, a historical communication not between the author of the communication and the target audience. A secondary historical readability measure may then be determined in step 342 based on the identified historical communication not between the author of the communication and the target audience. Also, a weighting value associated with the secondary historical readability measure may be determined in step 344 based on whether the identified historical communication not between the author of the communication and the target audience was transmitted or received by an additional audience. Based on: (i) the secondary historical readability measure; and (ii) the weighting value associated with the secondary historical readability measure, the second readability measure associated with the target audience may then be determined in step 346. Thus, it will be understood that the step 330 of determining a second readability measure associated with the target audience may comprise sub-steps 340-346 which may analyze previous communications involving the target audience (and not the author) so as to derive an indication of a readability of the target audience. Since such prior dialogue or communication employed by target audience may be relevant for indicating a preferential or established level of readability of the target audience, historical readability measures obtained using such historical communications not involving the author of the communication may be thought of as being 'secondary' for the purpose of assessing a preferred readability level.

In step 350, readability feedback signal for the communication is generated based on the first and second readability measures. For example, the step 350 of this example may comprise comparing (in step 352) the first and second readability measures (as obtained from steps 320 and 330 respectively) and then generating (in step 354) the readability feedback signal based on the result of the comparison. For instance, a warning signal may be generated if the result of the comparison (in step 352) indicates that a difference between the first and second readability measures exceeds a predetermined acceptable threshold (in other words, if the first readability measure is above or below the second readability measure by more than a predefined amount).

From the above description, it will be understood that proposed embodiments may employ the concept of determining a (second) readability measure for the target audience by analyzing previous or historical communications involving the target audience. In doing so, previous or historical communications between the author (e.g. writer, creator or originator) of the communication and the target audience may be analyzed as being preferential for the purpose of determining a target readability measure for the communication. However, in some instances, information regarding previous or historical communications between the author (e.g. writer, creator or originator) of the communication and the target audience may not be available (e.g. because they have never occurred before). Proposed may cater for this by also being adapted to analyze previous or historical communications involving the target audience (but not the author of the communication) in order to determine a target readability measure for the communication. Of course, a combination of such analysis may be used. For example, it may be useful to refine a target readability measure for the communication that has been determined based only on very old historical communications between the author of the communication and the target audience, and this may be done by analyzing more recent communications involving the target audience (but not the author of the communication) to see if a change in a readability capability of the target audience has occurred.

By way of further explanation, an exemplary embodiment will now be described as follows:

(I) The author of an email adds a target recipient to the e-mail.

(II) A readability score for the recipient is calculated based on previous communications of the recipient from all text sources e.g. e-mail, instant messaging, tweets etc.

(II)(a) Any direct communication (e.g. a direct message between the author and the recipient) is scored in preference to any indirect communication (e.g. a message involving other recipients in addition to the (current) target recipient). In this way, direct messages may be used in preference to public slack-channel conversations (although a private channel may be used with a higher preference).

(II)(b) In the absence of any existing communications either because there weren't any, or they aren't available for analysis then: (ii)(b)(1) peers of the recipient are determined through sources such as a company directory or public social media profiles; and (ii)(b)(2) reading score for the recipient is generated based on their peer communications with the same preferences as in step (ii)(a) above.

(III) While the e-mail is being composed: (i) the current readability score of the email is determined: (ii) the author is warned if the current readability score exceeds the readability score for the recipient. In the event of multiple recipients, the lowest score of people in the addressee/'to' field of the email may be used as the warning baseline/threshold.

In some embodiments, there may be provided a system comprising a processing arrangement adapted to carry out any method previously described with reference to FIGS. 1 to 3.

Figure 4:
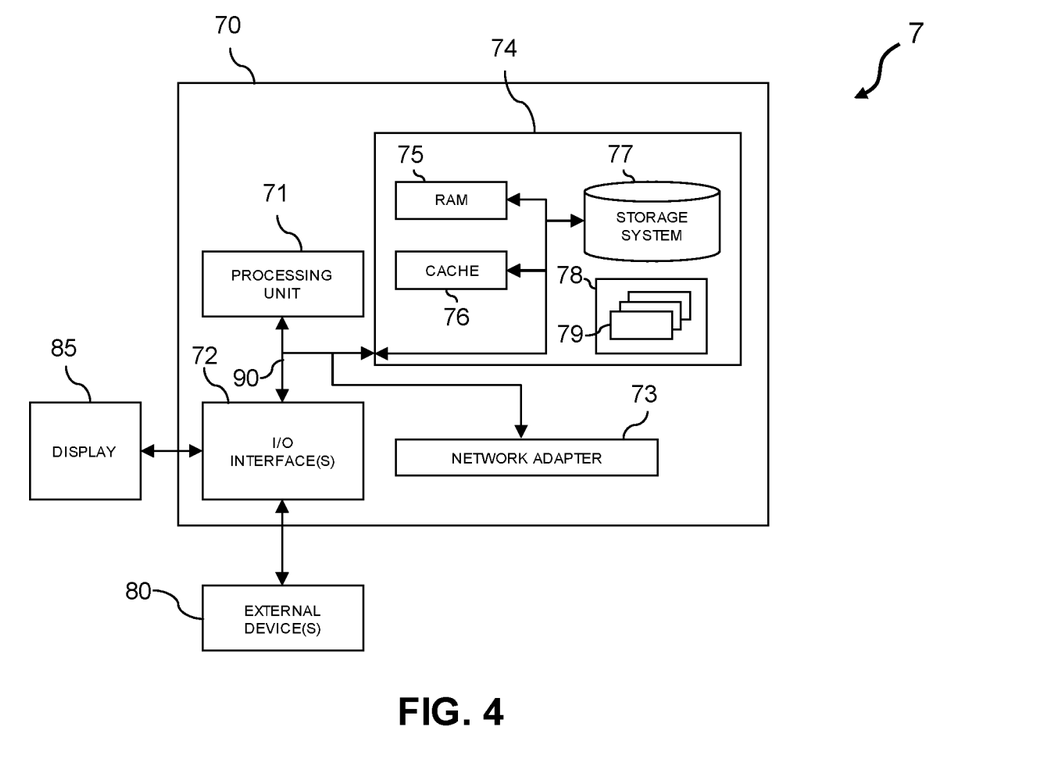
FIG. 4 depicts a system for controlling access to protected information stored in a database, according to various embodiments.

By way of example, as illustrated in FIG. 4, embodiments may comprise a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for analyzing readability of a communication intended for a target audience, the system configured to:
   analyze the communication to determine a first readability measure associated with the communication, wherein the first readability measure comprises a numerical value representative of a readability level of the communication, and wherein the readability level of the communication is a reading difficulty level of text in the communication;
   determine a second readability measure associated with the target audience based on one or more historical communications previously transmitted or received by the target audience, the one or more historical communications comprising at least a historical communication between an author of the communication and the target audience, wherein the second readability measure comprises a numerical value representative of a readability level for the target audience, and wherein the readability level of the target audience is a reading difficulty level of text in communications associated with the target audience; and
   generate a readability feedback signal for the communication based on the first readability measure and the second readability measure.

2. The system of claim 1, wherein determining the second readability measure associated with the target audience comprises:
   determining a primary historical readability measure based on the historical communication between the author of the communication and the target audience; and
   determining the second readability measure associated with the target audience based on the primary historical readability measure.

3. The system of claim 2, wherein determining the second readability measure associated with the target audience further comprises:
   determining a weighting value associated with the primary historical readability measure based on whether the historical communication between the author of the communication and the target audience was transmitted or received by an additional audience,
   wherein the determining the second readability measure associated with the target audience is further based on the weighting value associated with the primary historical readability measure.

4. The system of claim 2, wherein determining the second readability measure associated with the target audience further comprises:
   identifying, from the one or more historical communications, a historical communication not between the author of the communication and the target audience;
   determining a secondary primary historical readability measure based on the identified historical communication not between the author of the communication and the target audience; and
   determining the second readability measure associated with the target audience based on the secondary historical readability measure.

5. The system of claim 4, wherein determining the second readability measure associated with the target audience further comprises:
   determining a weighting value associated with the secondary historical readability measure based on whether the identified historical communication not between the author of the communication and the target audience was transmitted or received by an additional audience,
   wherein the determining the second readability measure associated with the target audience is further based on the weighting value associated with the secondary historical readability measure.

6. A computer program product comprising a non-transitory computer readable storage medium having program instructions embodied therewith, the program instructions executable by a processing unit to cause the processing unit to perform a method comprising:
   analyzing the communication to determine a first readability measure associated with the communication, wherein the first readability measure comprises a numerical value representative of a readability level of the communication;
   determining a second readability measure associated with the target audience based on one or more historical communications previously transmitted or received by the target audience, the one or more historical communications comprising at least a historical communication between an author of the communication and the target audience, wherein the second readability measure comprises a numerical value representative of a readability level for the target audience; and generating a readability feedback signal for the communication based on the first readability measure and the second readability measure.

7. The computer program product of claim 6, wherein determining the second readability measure associated with the target audience comprises:

determining a primary historical readability measure based on the historical communication between the author of the communication and the target audience; and determining the second readability measure associated with the target audience based on the primary historical readability measure.

8. The computer program product of claim 7, wherein determining the second readability measure associated with the target audience further comprises:

determining a weighting value associated with the primary historical readability measure based on whether the historical communication between the author of the communication and the target audience was transmitted or received by an additional audience, wherein the determining the second readability measure associated with the target audience is further based on the weighting value associated with the primary historical readability measure.

9. The system of claim 1, wherein the first readability measure is determined by a function of at least one of average sentence length, average word frequency, and average number of syllables in a word.

10. The system of claim 1, wherein the communication comprises at least one of:

an electronic text material, an electronic document, and an electronic message.

* * * * *